United States Patent [19]

Pearl

[11] 4,294,481

[45] Oct. 13, 1981

[54] GAS CYLINDER CARRIER

[75] Inventor: Douglas B. Pearl, Pompano Beach, Fla.

[73] Assignee: Uniweld Products, Incorporated, Ft. Lauderdale, Fla.

[21] Appl. No.: 163,176

[22] Filed: Jun. 26, 1980

[51] Int. Cl.[3] .................................................. B62B 1/14

[52] U.S. Cl. .................................... 294/146; 248/129; 248/154; 248/313; 280/47.19; 294/31.2; 294/159; 414/448

[58] Field of Search ....................... 294/27 H, 31.2, 33, 294/87 R, 87.2, 141-143, 146, 159-166; 280/47.17-47.19, 47.24-47.27; 414/444, 448; 211/71, 74; 248/129, 154, 68 R, 313, 316 R, 316 D, 3.59; 220/23.2, 23.4, 23.8, 85 H

[56] References Cited

U.S. PATENT DOCUMENTS

| | | | |
|---|---|---|---|
| 2,092,456 | 9/1937 | Hunker | 294/159 |
| 2,131,673 | 9/1938 | Robinson | 280/47.19 |
| 2,404,513 | 7/1946 | McCabe | 211/71 |
| 2,624,483 | 1/1953 | Ketzel | 248/129 |
| 2,723,864 | 11/1955 | Schierman | 280/47.19 |
| 3,028,043 | 4/1962 | Angstadt | 206/202 |
| 3,111,333 | 11/1963 | Marini et al. | 248/129 |
| 3,247,564 | 4/1966 | Barnum | 248/129 |
| 3,369,724 | 2/1968 | Ettlinger | 294/143 |
| 4,033,489 | 7/1977 | Fowler | 294/159 |
| 4,098,403 | 7/1978 | Davis | 220/23.8 |

FOREIGN PATENT DOCUMENTS

| | | | |
|---|---|---|---|
| 2414452 | 9/1979 | France | 294/31.2 |
| 338357 | 6/1959 | Switzerland | 280/47.26 |
| 758694 | 10/1956 | United Kingdom | 294/137 |
| 821363 | 10/1959 | United Kingdom | 211/71 |
| 965459 | 7/1964 | United Kingdom | 211/71 |

*Primary Examiner*—Stephen Marcus
*Attorney, Agent, or Firm*—James J. Burke, II

[57] ABSTRACT

A welding cylinder truck adopted to hold one large tank on one side and, on the other side, either one similarly sized or intermediate sized tank of another gas or a pair of small tanks. The carrier of the invention, by virtue of this design, is more versatile than carriers heretofore available.

3 Claims, 2 Drawing Figures

GAS CYLINDER CARRIER

BACKGROUND OF THE INVENTION

The present invention relates in general to gas cylinder carries and, more particularly, it relates to welding cylinder trucks.

In the welding arts, it is often necessary to bring the welding equipment to the workpiece rather than the other way around. This involves transport of gas cylinders: oxygen, acetylene and/or compressed air, for the commonest forms of welding. To facilitate such transport, welding cylinder trucks have long been available. They comprise a base with gas cylinder(s) support, a pair of wheels being provided on larger models, a vertically-extending upright member terminating in a bicycle-type hand-grip, and means for retaining the cylinders in the upright position while the truck is pushed or carried to the workpiece location. Such retaining means may be a metal ring attached to the upright member, or a bar with a chain or resilient member to restrain the cylinder thereagainst. Other support means (e.g. vertical braces between the base and the ring or bar) may be provided to increase structural integrity.

The tanks themselves are heavy, being pressure vessels, and chains or resilient restraints are deemed less than satisfactory by workers. Yet, though the tanks are "standard," they come in a variety of sizes, so rigid metal rings are of limited use. Most commonly, "R-Oxy", "MC" and "B" size tanks are used, but the larger 60 and 90 cu. ft. tanks for both acetylene and oxygen are also in wide service.

OBJECTS OF THE INVENTION

The main object of the present invention is to provide a gas cylinder carrier adopted to safely and conveniently carry a variety of sizes of said cylinders.

Various other objects and advantages of the invention will become clear from the following description of an embodiment of same, and the novel features will be particularly pointed out in connection with the appended claims.

THE DRAWINGS

Reference will hereinafter be made to the accompanying drawings, wherein:

FIG. 1 is a perspective view of a gas cylinder carrier in accordance with the invention; and FIG. 2 is a partial plan view of the novel cylinder retaining means employed in the invention, showing how either one large or two small cylinders are held.

DESCRIPTION OF EMBODIMENTS

Figure 1:
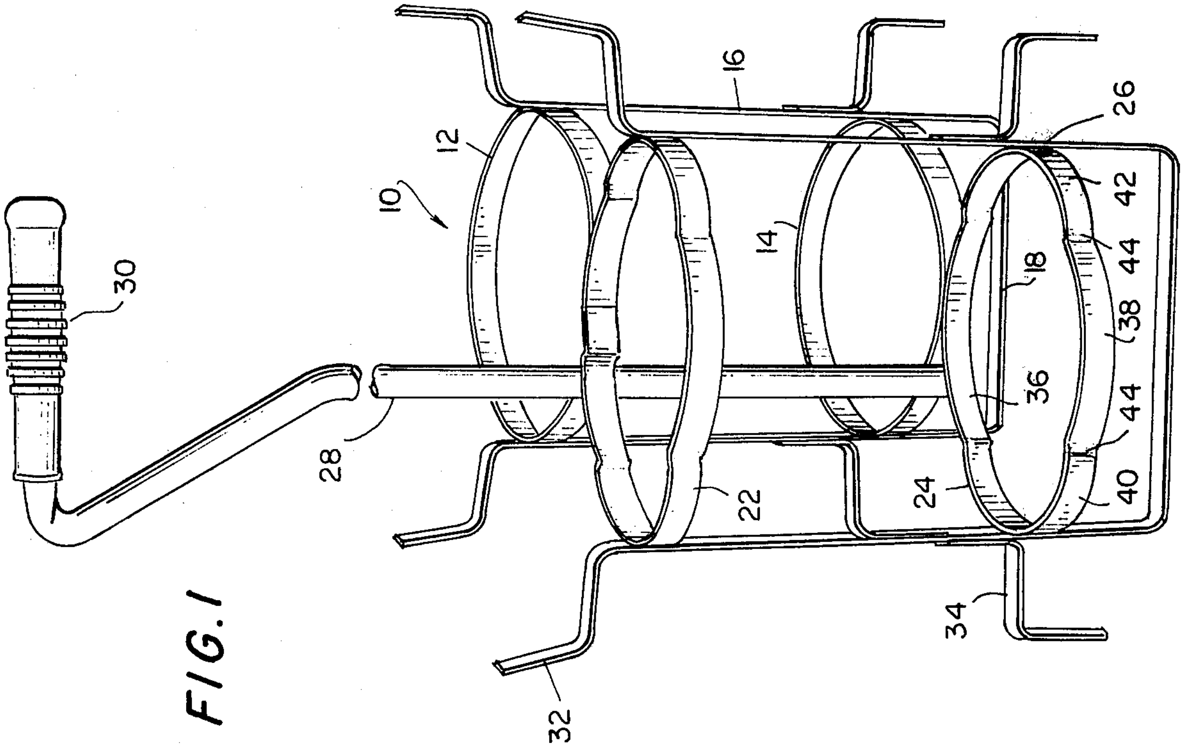

FIG. 1 illustrates a hand-carryable welding cylinder stand adapted for relatively small cylinders, and attention is directed thereto. Generally the word "stand" is used with hand-carried devices, and "truck" is used on larger stands that are wheeled.

A first cylinder retainer 10 comprises an upper and a lower metal ring 12, 14 held in position by a generally U-shaped base member 16, the bottom of the "U" 18 forming a support for the bottom of a gas cylinder (not shown). Retainer 10 may be conveniently fabricated from $\frac{3}{4}$ in. by $\frac{1}{8}$ in. strip steel or aluminum stock, and welding may be used at all points required to be secured.

A second cylinder retainer 20 is adjacent and welded to retainer 10. It also includes a pair of ring members 22, 24, described below, and a U-shaped base member 26. Adjacent the points of attachment of retainers 10 and 20 a vertical handle member 28 is welded, and extends upwardly, to a point above the tops of the cylinders (not shown,) and at its upper end has a horizontal grip 30. Handle member 28 may be fabricated from 1 in. pipe stock.

To facilitate carrying of the welding torch and required hoses, it is preferred to bend the tops of base members 16, 26 outwardly in a general "L" shape, as shown at 32, and, near the bottom of each side of the base, weld on a second L-shaped member, but inverted, as at 34. This provides two sets of four brackets, one set on each side, around which hoses may be wound.

Figure 2:
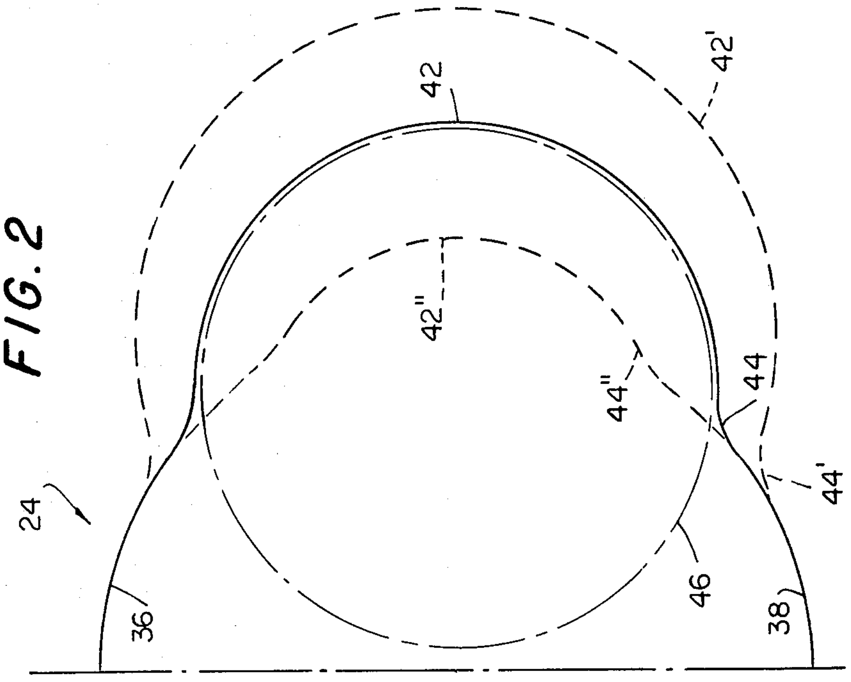

The novel features of the invention is in the shape of rings 22 and 24, and attention is directed thereto and to FIG. 2. Each said ring includes two pairs of opposed, spaced arcurate sections. The first pair 36, 38 may, for example, be spaced so as to form ring sections of the same diameter as rings 12, 14. In that case, the stand may be used to carry two cylinders of the same size. The second pair of opposed, spaced, arcurate sections 40, 42 is integral with sections 36, 38, the four sections being joined at "corners" or junction points 44. The radius of sections 40, 42 is smaller than that of sections 36, 38, and is a radius adapted to contain a smaller standard size gas cylinder. The number of degrees of arc in sections 40, 42 (e.g. their length), and the consequent location of junction points 44, is selected so that two of such smaller cylinders will be retained therebetween. This is better seen in FIG. 2, which is a partial plan view of ring member 24. In FIG. 2, a small cylinder is indicated at 46, and arcurate section 42 includes about 180° of arc.

If it is desired to accommodate a pair of cylinders larger than cylinder 46, the radius of section 42 is enlarged, as shown at 42' and its length includes more than 180° of arc, shifting the junction point from 44 to 44'. Similarly, a cylinder smaller than 46 will be accommodated, 42'', 44''; in each case, the far side of the cylinder (e.g. the side away from section 42) will extend to the mid-point 48 of ring 24, so a pair of cylinders will fit within the rings.

It will be appreciated that the radii of sections 42 and 36, 38 is actually somewhat larger than those of the tanks they are adapted to retain; what is desired is a rather loose fit.

It will also be appreciated that the left half of retainer ing member 24 need not be a mirror image of the right half shown in FIG. 2. It could be as shown at any of 42, 42' or 42'', in which case the ring 24 will retain one cylinder between sections 36 and 38, or a pair of different sized cylinders between sections 40 and 42. Generally, however, ring member 24 will be symmetrical about the certerline.

Various other modifications are apparent: a solid base, fabricated from sheet stock, may be employed. A pair of wheels may be added. A small box to contain tools, spare welding tips and welding rods is convenient. These and other changes or modifications of the details, steps, materials and arrangements of parts, which have been herein described and illustrated to explain the nature of the invention, may be made by those skilled in the art within the principle and scope of the invention as defined in the appended claims.

What is claimed is:

1. In a gas cylinder stand or truck including cylinder support or base means, handle means and cylinder retaining means, improvements in said cylinder retaining means comprising:

first and second pairs of spaced, opposed arcurate sections;

said first pair of said sections being spaced and having a radius to accommodate and retain a gas cylinder of a given size therebetween;

said second pair of said sections being joined to said first pair at four junction points to form a unitary, cylinder-retaining structure;

said second pair of said sections having radii and an included angle or length to accommodate two adjacent gas cylinders of smaller size than said given size therebetween;

the radii of said second pair of said sections being smaller than the radius of said first pair of said sections.

2. The gas cylinder stand or truck as claimed in claim 1, wherein the radii of said second pair of said second sections are the same, whereby said retaining structure may accommodate either one cylinder of said given size or two identical cylinders of smaller size.

3. The gas cylinder stand or truck as claimed in claim 1, and additionally comprising a second cylinder retaining means adjacent to said cylinder retaining means.

* * * * *